Patented June 3, 1952

2,598,803

UNITED STATES PATENT OFFICE 2,598,803

BETA SUBSTITUTED GAMMA LACTONES

Elbert C. Ladd and Homer W. Paxton, Passaic, N. J., assignors to United States Rubber Company, New York, N. Y., a corporation of New Jersey No Drawing. Application September 27, 1950, Serial No. 187,154

7 Claims. (Cl. 260—344)

The invention relates to a new class of compounds, the gamma-lactones of beta-acyl-beta-carbalkoxy-gamma-hydroxy-alkanoic acids and a method for their preparation. We have found that these novel materials can be readily obtained by the condensation of an alpha-acyl-succinic acid ester with an aldehyde, as illustrated below in reaction 1:

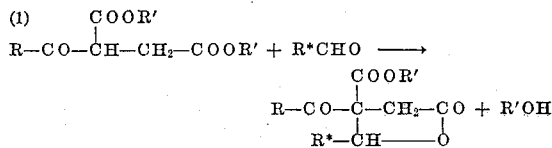

In the above reaction R is alkyl (e. g., methyl, ethyl, propyl, isopropyl, butyl, isobutyl, amyl, hexyl, 2-ethylhexyl heptyl, octyl, nonyl, decyl, undecyl, and dodecyl), or aryl (e. g. phenyl, tolyl, xylyl, p-chlorophenyl, p-methoxyphenyl, and naphthyl); each R' is alkyl or aryl as defined for R, but is preferably alkyl, particularly lower alkyl, e. g., methyl, ethyl, propyl, and butyl, since these lower alkyl esters are the most readily available; and R* is a radical from the class of hydrogen and R as defined above.

The acyl succinic esters which are used as intermediates are obtainable by the general method shown in "Organic Syntheses," volume XIV, pages 38–39 (1934), by Adkins, Isbell, and Wojcik.

The preparation of our new lactones can be effected by mixing the appropriate aldehyde and alpha-acyl-succinic acid ester initially, or by incremental addition preferably throughout the first half of the reaction. Many of these reactions are markedly exothermic and hence only moderate reaction temperatures, e. g., 0–100° C., are usually necessary. The reactions are promoted by the presence of a small amount, e. g., 0.1–5.0% (based on the reactants), of an ionic type catalyst including acidic materials such as hydrogen chloride and boron trifluoric etherates and organic and inorganic bases including piperidine, sodium hydroxide, potassium hydroxide, calcium hydroxide and sodium methoxide. The basic type catalysts are preferred when formaldehyde is employed as a reactant in our process.

The reaction time varies somewhat with the temperature, catalyst and reactants employed, but may be as little as 1 hour, and it seldom exceeds 48 hours. The reaction products can be isolated and purified by preferential extraction and/or by fractional distillation.

Those gamma-butyrolactones herein in which the groups R and R* are identical can be prepared directly, without isolation of the intermediate alpha-acylsuccinic ester, by heating two moles of an aldehyde with one mole of the corresponding maleic ester (dialkyl maleate). In such case one molecule of aldehyde is considered to add to the maleic ester to form the alpha-acylsuccinic ester, which then reacts with a second molecule of the aldehyde as described herein to form a lactone.

Our new lactones are useful in a variety of applications, including use as intermediates in the preparation of synthetic pharmaceuticals. These lactones likewise find use as plasticizers and softening agents for high polymers, e. g., for polyvinyl chloride and copolymers of acrylonitrile with various olefinic compounds, e. g., with butadiene or isobutylene.

The following examples disclose our invention in more detail.

Example 1

A mixture of 122 g. of diethyl alpha-butyryl-succinate and 144 g. of n-butyraldehyde is heated at reflux for 43 hours. Any unreacted butyraldehyde is then evaporated off and the residue is fractionally distilled to yield the new compound, the gamma-lactone of beta-butyryl-beta-carbethoxy-gamma-hydroxy-heptanoic acid, B. 140–2° C./2.0 mm.; $n_D^{20}$ 1.4600;

$$d_{20}^{20}\ 1.084$$

Percent carbon=62.24 (theory=62.22%); percent hydrogen=8.12 (theory=8.22%).

The new compound reacts with 2,4-dinitrophenyl-hydrazine in glacial acetic acid to yield a hydrazone derivative, M. 193–4° C.; percent nitrogen=23.29.

The new lactone can be hydrolyzed by alkali or dilute acids to the known compound, 4-oxoheptanoic acid, M. 47.5–48.5° C.; B. 123–6° C./3.5 mm.; percent carbon=58.64 (theory=58.35%); percent hydrogen=8.23 (theory=8.39%); neutral equivalent=143.5 (theory=144).

Example 2

(a) In the manner of Example 1, the reaction of acetaldehyde with diethyl alpha-acetylsuccinate yields a new compound, beta-acetyl-beta-carbethoxy - gamma - valerolactone, B. 145–6° C./1.0 mm.; M. 48–9° C.; $n_D^{20}$ 1.4599

$$d_{20}^{20}\ 1.181$$

Percent carbon=56.46 (theory=56.04%); percent hydrogen=6.64 (theory=6.59%).

(b) The keto-lactone of Example 2(a) is reduced to a hydroxy-lactone by heating 59.5 g. thereof with 45 g. of aluminum isopropoxide and 200 ml. of isopropanol and removing, by distillation, the acetone formed in the reaction. At the end of the reaction the isopropanol is removed by evaporation and the residue is treated with a cold solution of 70 ml. of concentrated hydrochloric acid and 375 ml. of water. The mixture is then extracted with benzene, and the extracts are combined and dried. Fractional distillation of the extract yields 26.5 g. of the new lactone, beta-(1 - hydroxyethyl)-beta-carbisopropoxy-gamma-valerolactone, B. 90–1° C./0.6 mm.; $n_D^{20}$ 1.4356

$$d_{20}^{20}\ 1.065$$

Percent carbon=57.43 (theory=57.38%); percent hydrogen=7.66 (theory=7.89%).

(c) One hundred sixty-five and five-tenths grams of the lactone of Example 2(a) are hydrolyzed by heating at reflux with a mixture of 73.2 g. of 85% sodium hydroxide and 537.0 g. of water for 1.5 hours.

The reaction mixture is then cooled, extracted with diethyl ether and the ether-insoluble material is acidified and extracted with diethyl ether. The extract is then dried and fractionally distilled to yield 35.4 g. of levulinic acid, B. 98–9° C./0.9 mm.; it forms a derivative with 2,4-dinitrophenyl-hydrozine, M. 199–201° C. uncorrected. No depression of the melting point occurs when this derivative is admixed with an authenic sample of 2,4-dinitrophenylhydrazine of levulinic acid.

Example 3

(a) In the manner of previous examples, the reaction of n-butyraldehyde with diethyl alpha-acetyl-succinate yields a new lactone, the gamma-lactone of beta-acetyl-beta-carbethoxy-gamma-hydroxy-heptanoic acid, B. 140–2° C./2.0 mm.; $n_D^{20}$ 1.4600; 2,4-dinitrophenylhydrazine derivative, M. 175–176.5° C. (per cent nitrogen=11.77).

(b) Similarly, from the reaction of diethyl alpha-butyryl-succinates with acetaldehyde, in the presence of dry hydrogen chloride, is obtained a new lactone, beta-butyryl-beta-carbethoxy-gamma-valerolactone, B. 130–4° C./0.7 mm.; $n_D^{20}$ 1.4609; 2,4-dinitrophenylhydrazine derivative, M. 192–4° C. (per cent nitrogen=21.74).

(c) From the reaction of benzaldehyde with diethyl alpha-butyryl-succinate is obtained a new lactone, considered to be beta-butyryl-beta-carbethoxy - gamma - phenyl - gamma - butyrolactone, B. 173–6° C./2.5 mm.; $n_D$ 1.5251.

Example 4.—Reaction of formaldehyde with diethyl alpha-butyrosuccinate 48.8 g. (0.20 mole)—diethyl alpha-butyroylsuccinate
9 g. (0.11 mole)—37% formalin
0.5 g.—diethylamine The diethyl alpha-butyroylsuccinate is mixed with the formalin and the mix is cooled in an ice bath, and the diethylamine added in 5 minutes. The mixture is allowed to stand in a stoppered flask for 1 hour in the ice bath and then overnight at room temperature. Then it is heated 7 hours in the steam bath. The cooled mixture is poured into water and the oil separated. The oil is washed with dilute hydrochloric acid and then with water, dried and distilled. A forerun of 25 g. of diethyl alpha-butyroylsuccinate is obtained, followed by 16 g. of the new product, beta-butyryl - beta - carbethoxy - gamma - butyrolactone, B. P. 130–134° C. at 0.65 mm., $n_D^{20}$=1.4618.

Having thus described our invention, what we claim and desire to protect by Letters Patent is:

1. Beta - acyl - beta - carbalkoxy-alkanoic acid gamma-lactones, said acyl being selected from the class consisting of alkanoyl, benzoyl, and naphthoyl.

2. A method which comprises condensing an alpha-acyl-succinic acid ester with an aldehyde having from 1 to 12 carbons, and recovering a beta-acyl-beta-carbalkoxy-alkanoic acid gamma-lactone from the reaction products, said acyl being selected from the class consisting of alkanoyl, benzoyl, and naphthol.

3. Beta - acetyl - beta - carbethoxy - gamma-valerolactone.

4. Beta - butyryl - beta - carbethoxy - gamma-valerolactone.

5. The gamma-lactone of beta-acetyl-beta-carbethoxy-gamma-hydroxy-heptanoic acid.

6. Beta - butyryl - beta - carbethoxy - gamma-phenyl-gamma-butyrolactone.

7. Beta- butyryl - beta - carbethoxy - gamma-butyrolactone.

ELBERT C. LADD.
HOMER W. PAXTON.

No references cited.